Feb. 6, 1934.  P. M. JAUVERT  1,945,745
THERMOSTAT CONTROLLING TEMPERATURE FOR CENTRAL HEATING SYSTEMS
Filed March 9, 1929  2 Sheets-Sheet 2
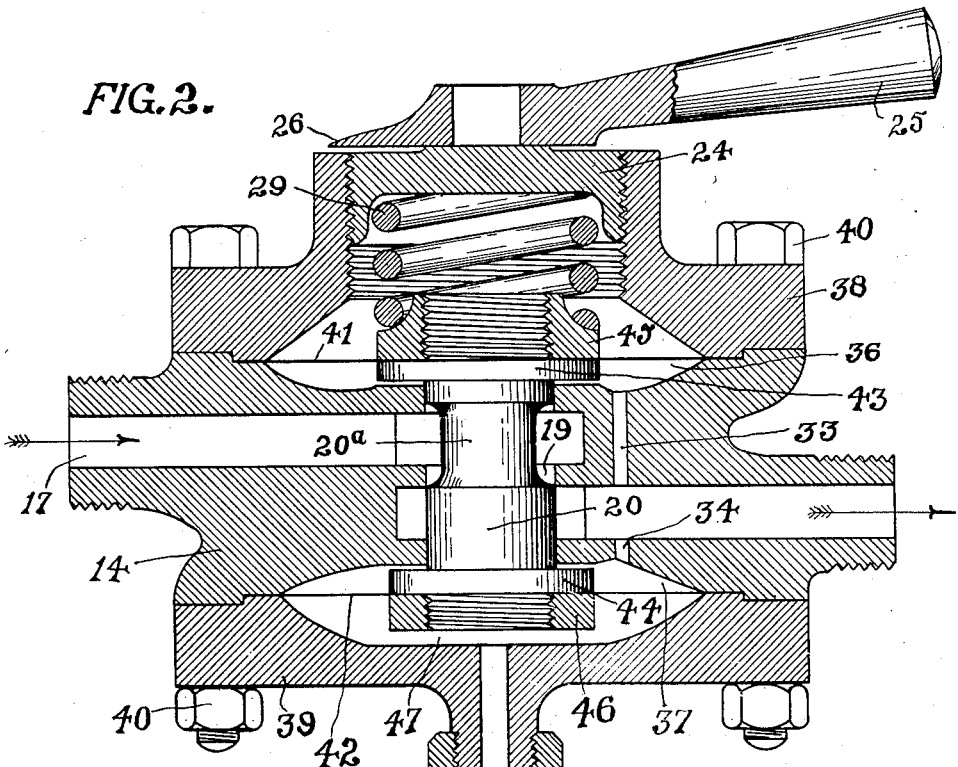
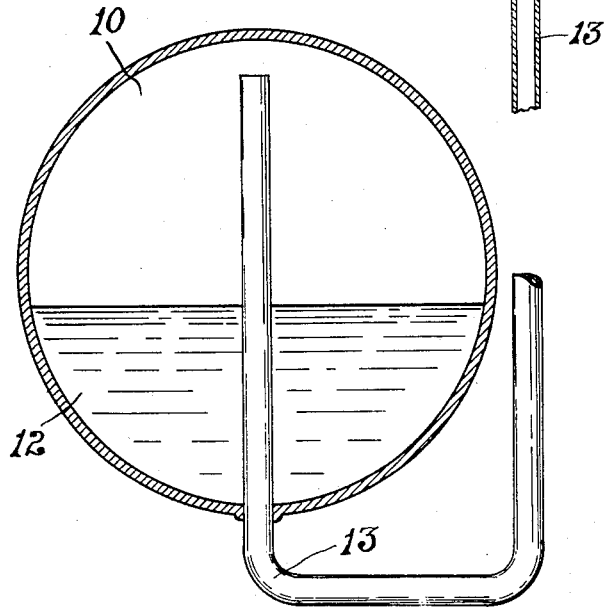
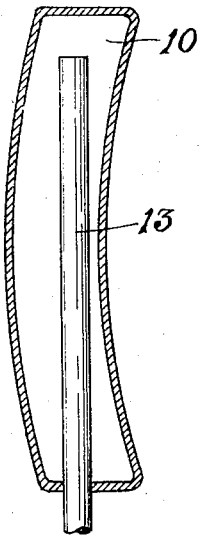
Inventor
P. M. JAUVERT
By Alan F. Garner
Attorney Patented Feb. 6, 1934

1,945,745

UNITED STATES PATENT OFFICE 1,945,745

THERMOSTAT CONTROLLING TEMPERATURE FOR CENTRAL HEATING SYSTEM

Pierre Maurice Jauvert, Bois Colombes, France, assignor, by mesne assignments, to Geo. M. Cressaty, Paris, France Application March 9, 1929. Serial No. 345,800

15 Claims. (Cl. 236—99)

The present invention relates to a thermostat for controlling the temperature of premises such as living rooms, offices and the like, in which a central heating system is employed, and it serves to regulate the hot water supply to the radiators on the premises, according to the temperature prevailing therein, the standard adjustment being made by the use of a single handle which is movable upon a sector which is graduated in degrees of temperature.

Another feature of the invention consists in the construction of an apparatus for controlling the temperature of rooms or the like, whose operation is independent of the height of the story of the building, and I also provide an apparatus in which there is no friction and in which all leakage of water is obviated without requiring the use of stuffing boxes or the like.

I further provide a controlling apparatus which is unaffected by the variations of hydrostatic pressure resulting from the separation, from the main circuit, momentary or prolonged, of any part of the heating apparatus used in the rooms of another story than the one considered.

The several features of the thermostat device by which the aforesaid results, or others, are obtained, are disclosed in the following description with reference to the accompanying drawings.

The drawings show by way of example two embodiments of the invention.

Fig. 2 is a like view of a modification.

Figure 3 is a view partly in section of the liquid container which is subjected to the temperature variation and, Figure 4 is a sectional view of Figure 3 taken on line 3—3.

Figure 1:
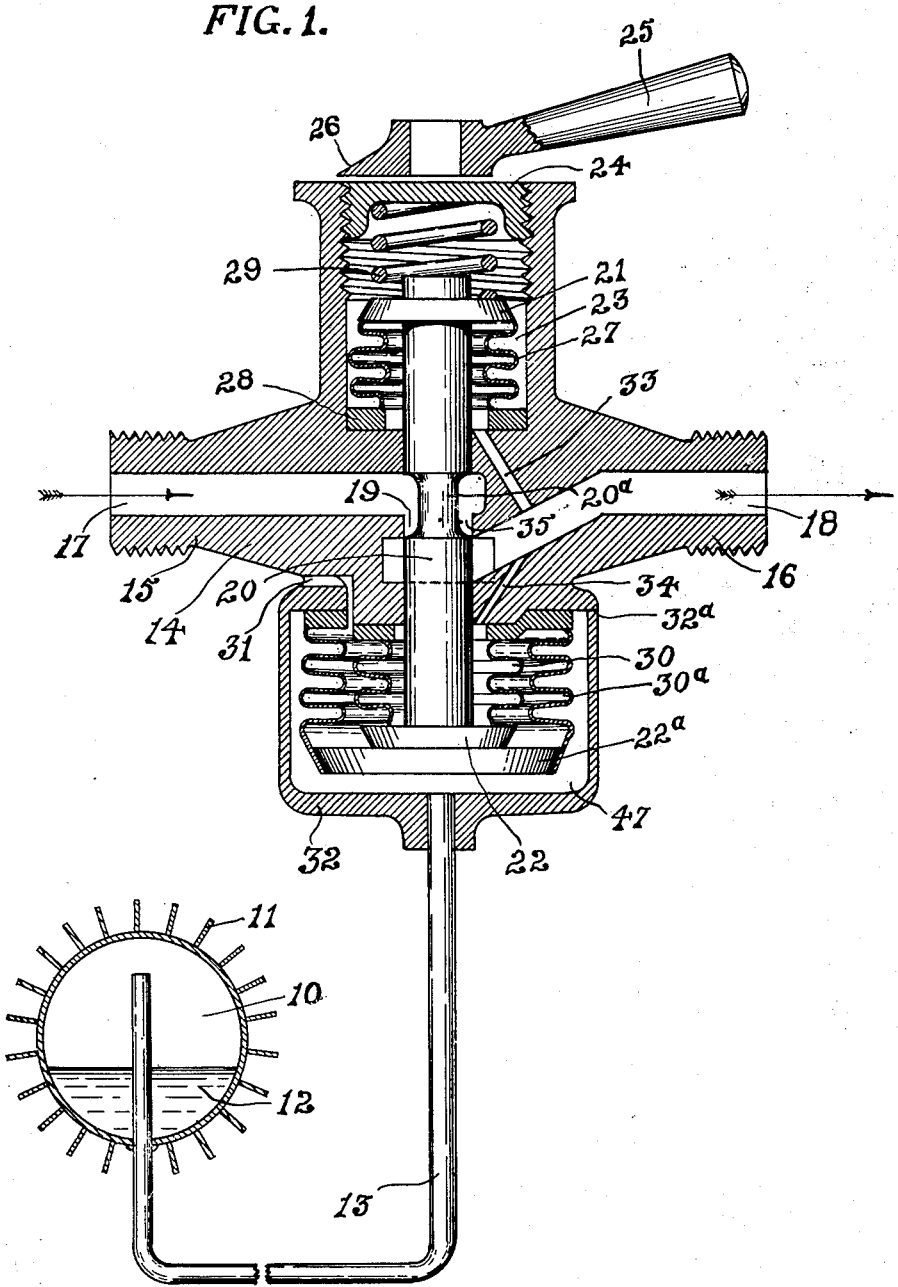
Fig. 1 is an elevational view, in section, of one embodiment of the invention.

In the construction shown in Figure 1, the controlling device according to the invention comprises a recipient 10 subjected to the temperature variations of the room or like premises containing the radiator under control, said recipient consisting of a simple metallic casing provided at the exterior with radial flanges or wings 11 for the better transmission of the heat of the air in the room to a saturated liquid 12, of suitable tension range, contained in said recipient 10. This latter is connected by a conduit 13 of small cross section to the main element of the apparatus which is mounted on the piping which supplies hot water to the radiator. As herein represented, the said conduit 13 opens into the recipient 10 above the level of the liquid which it contains, in order that the temperature in 13 shall have no effect upon the tensions of the vapor.

The said main element comprises a main body 14 having two tubular extensions 15—16 in each of which is a respective longitudinal conduit 17—18. The said extensions 15—16 serve to connect the controlling apparatus to the pipes supplying hot water to the radiator, said water entering the apparatus through the conduit 17 and issuing through the conduit 18, which two conduits open into a central vertical conduit 19 passing entirely through the apparatus. As herein represented, the conduit 18 opens into the conduit 19 at a point situated below the point of opening of the conduit 17.

In the central conduit 19 is slidable a rod 20, having a restricted part 20$^a$, and provided at the upper end with a disk 21 and at the lower end with two disks 22—22$^a$. The disk 21 is situated in the interior of a recess 23 in the main body 14 which is closed by a cap 24 screwed into the said recess. The cap 24 is provided with an operating handle having a pointer 26 movable before a sector which is graduated in degrees of heat, for a purpose hereinafter specified, the disk 21 is connected by its lower face with a flexible tube 27 whose other end is secured to a washer 28 secured to the back part of the said recess 23. The disk 21 and hence the rod 20 are urged by a spring 29 whereof one end makes contact with the said disk 21 and the other end makes contact with the cap 24. The spring 29 urges the rod 20 downwardly. The tension of the said spring is regulated by turning the handle 25.

The disk 22 is connected to the lower face of the main body 14 by a flexible tube 30 concentric with the rod 20 and resembling the tube 27. The disk 22$^a$ is connected to the lower face of the main body 14 by a flexible tube 30$^a$ concentric with the element 30 and hence with the rod 20. The space between the two tubes 30 and 30$^a$ is connected with the atmosphere by a conduit 31 formed in the main body 14. The two tubes 30—30$^a$ are contained in a strong metallic casing secured at 32$^a$ to the main body 14 into which is caused to open the conduit 13 leading from the recipient 10.

The restricted part 20$^a$ of the rod 20 is situated adjacent the intersection of the conduits 17 and 18 with the central conduit 19, so as to make connection between the conduits 17 and 18 during the descent of the said rod 20.

The non-leaking action of the said controlling apparatus and the absence of friction and of hydrostatic influence are obtained, in the present example, by the fact that the said rod 20 is not in contact with its casing, since a complete separation of the conduits 17 and 18 is never required, and that all connection with the exterior is cut off by the arrangement of the said tubes 30—30ª which allow the motion necessary for the functioning, without appreciable resistance.

On the other hand, the hydrostatic pressure which acts upon the rod 20 and modifies the adjustment in the known apparatus, will in this case act upon the two ends of the tubes 27 and 30 and will thus be exactly equilibrated, the pressure in said tubes being assured by the small conduits 33—34.

The operation is as follows. The spring 29 having been adjusted by the handle 25 to the tension corresponding to the temperature which is to be maintained in the room, the fluid contained in the recipient 10 disposed towards the center of said room will have a tension corresponding to the room temperature, and this tension acts upon the flexible tube 30ª which acts against the spring 29, so that the whole combination of movable parts will assume a position of equilibrium by which the flow section of the water at 35 will be determined.

If the temperature of the room exceeds the regulated value, the tension of the vapor in the recipient 10 will increase and will cause the upward sliding of the rod 20 against the spring 29, and thus the flow section at 35 is reduced. If the temperature of the room falls below the regulated value, the vapor tensions in the said recipient 10 will decrease, and the action of the spring 29 now preponderates, and the rod 20 descends, thus increasing the flow section at 35.

When assembling the apparatus, the two flexible tubes 27—30, which possess a certain tension due to their own elasticity, should not have the same length, for this would act against the sensitiveness of the apparatus, but they should have different lengths, and this, in the inoperative position, will give a resultant effort in the downward direction, thus adding to the effect of the spring 29. This is necessary on account of the tendency which the two tubes, of equal length, would have to maintain, by their natural tension, the whole device at a point half-way upon its stroke, thus modifying the sensitiveness by opposing—to a certain degree—the displacement due to the tube 30ª.

In the case of Figures 2 and 3, in which the indications show parts corresponding to those of Figure 1, the main body 14 has a less height, and it comprises two recesses 36—37 formed by the two respective caps 38—39 secured to said body by the bolts 40. Between each cap 38—39 and the body 14 is mounted a respective elastic diaphragm 41—42, resting upon the respective disks 43—44 of the rod 20 upon which they are held by the nuts 45—46. As before, the recipient 10 is connected by the conduit 13 to the chamber 47 formed in the cap 39 by the diaphragm 42.

In this construction, the rod 20 has a relatively large diameter, and hence its stroke may be reduced, a small movement corresponding to a considerable variation of the flow section for the water in the main body 14.

The said apparatus thus constitutes a thermostat for the control of the temperature in rooms provided with central heating, by which the water supply to the radiators in the said rooms will be automatically regulated.

Although I have disclosed one of the forms that my invention may take, it is to be understood that other methods of applying the principles involved may be utilized without departing from the invention. And while I have illustrated the invention as applied to a heating system, it will be understood that I may use it in other connections, such as refrigerating systems, for instance, or any other system in which a flow of heating or cooling medium may be regulated.

What is claimed is:

1. In an apparatus controlling the supply of hot water to radiators for room heating: a main body traversed by the current of hot water proceeding to the radiator; a closing device movable in said body and entirely traversing the same; two flexible elements having different tensions and connecting the respective ends of the said closing device to the said body; a saturated liquid which is subjected to the variations of temperature of the premises and whose tensions act upon the end of the said closing device provided with the flexible element having the smallest tension; and adjustable elastic means acting upon the end of the closing device provided with the flexible element having the greatest tension, in order to equilibrate the tensions of said liquid for a given temperature of the premises.

2. In an apparatus controlling the supply of hot water to radiators for room heating: a main body; a vertical conduit formed in said body; a hot water supply conduit opening into the said vertical conduit; a hot water discharge conduit also opening into the said vertical conduit; a closing device movable in said vertical conduit; two fluidtight chambers with deformable walls connecting the two respective ends of said closing device to the said body; and conduits connecting the said chambers to the said hot water discharge conduit.

3. In an apparatus controlling the supply of hot water to radiators for room heating: a main body; a vertical conduit formed in said body; a hot water supply conduit opening into said vertical conduit; a hot water discharge conduit also opening into the said vertical conduit; a closing device slidable in said vertical conduit; a restricted portion formed on said closing device at a point adjacent the said hot water supply and discharge conduits; two fluidtight chambers with deformable walls connecting the respective ends of said closing device to the said main body.

4. In an apparatus controlling the supply of hot water to radiators for room heating: a main body; a vertical conduit formed in said body; a hot water supply conduit opening into said vertical conduit; a hot water discharge conduit; a hot water discharge conduit also opening into the said vertical conduit below the said hot water supply conduit; a closing device slidable in said vertical conduit; a restricted portion formed on said closing device at a point adjacent the said hot water supply and discharge conduits; two fluid-tight chambers with deformable walls connecting the respective ends of said closing device to the said main body.

5. In an apparatus controlling the supply of hot water to radiators for room heating: a main body traversed by a current of hot water; a vertical closing device movable in said body and entirely traversing the same; a fluidtight chamber with deformable walls connecting the upper part of said closing device to the said main body; two fluid tight chambers with concentric deformable walls connecting the lower part of said closing device with said main body; means affording an atmospheric connection for the space between said concentric chambers.

6. In an apparatus controlling the supply of hot water to radiators for room heating; a main body traversed by the current of hot water; a vertical closing device movable in said body; a fluidtight chamber with deformable walls connecting the upper end of said closing device to said main body; two fluidtight chambers with concentric deformable walls connecting the lower end of said closing device to the said main body; a rigid fluidtight chamber secured to said main body and surrounding the two concentric chambers; a recipient subjected to the temperature changes of the premises and containing a saturated liquid; a tube connecting said recipient to said chamber; an adjustable spring acting upon the upper end of said closing device, in order to equilibrate the tensions of said liquid for a given temperature of the premises.

7. In an apparatus controlling the supply of hot water to radiators for room heating; a main body traversed by the current of hot water; a vertical closing device movable in said body; a fluidtight chamber with deformable walls connecting the upper end of said closing device to said main body; two fluidtight chambers with concentric deformable walls connecting the lower end of said closing device to the said main body; a rigid fluidtight chamber secured to said main body and surrounding the two concentric chambers; a recipient subjected to the temperature changes of the premises and containing a saturated liquid; a tube connecting said recipient to said chamber; a spring acting upon the top of said closing device; a graduated handle for regulating the tension of the said spring in order to equilibrate the tensions of said liquid for a given temperature of the premises.

8. In an apparatus for controlling the flow of a fluid, a casing having a fluid passage therethrough, a valve in said casing for controlling the flow of fluid in the passage, a pair of spaced elastic members in said casing for actuating said valve having chambers on each side thereof, said casing having passages connecting two of said chambers with the fluid passage, a temperature responsive fluid communicating with another of said chambers and means for adjusting said valve to a predetermined actuating temperature.

9. In an apparatus for controlling the flow of fluid, a main body having a fluid passage therethrough, a valve for controlling the flow of fluid through said passage, a pair of spaced elastic members for actuating said valve having chambers on each side thereof, two of said chambers communicating with the fluid passage, and another of said chambers communicating with a temperature responsive liquid supply and resilient means for adjusting said valve to a predetermined actuating temperature.

10. In an apparatus for controlling the flow of fluid, a casing having a fluid passage therein, a valve for controlling the flow of fluid thru said passage, spaced elastic members associated with said valve for actuating said valve and having chambers on each side thereof, one chamber of each elastic member communicating with the fluid passage, another chamber being connected respectively with a source of temperature responsive liquid, and means for adjusting the valve to a predetermined actuating temperature.

11. In an apparatus for controlling the flow of a fluid, a fluid conduit, a valve in said conduit, an elastic member associated with said valve having chambers on each side thereof, one of said chambers communicating with the fluid conduit, the other chamber communicating with a source of temperature responsive liquid, a second elastic member associated with said valve having a chamber on one side thereof communicating with the fluid conduit, and means on the other side for regulating the operation of said valve.

12. In an apparatus for controlling the flow of a fluid, a fluid conduit, a valve in said conduit, an elastic member associated with said valve having chambers on each side thereof, one of said chambers communicating with the fluid conduit, the other chamber communicating with a source of temperature responsive liquid, a second elastic member associated with said valve having a chamber on one side thereof communicating with the fluid conduit, and means for regulating the operation of said valve.

13. In an apparatus for controlling the flow of a fluid, a fluid conduit, a valve in said conduit, fluid chambers on each side of said valve, each having a deformable wall associated with said valve, two of said chambers communicating with the fluid conduit, and another of said chambers with a source of temperature responsive liquid and means for regulating the operation of said valve.

14. In an apparatus for controlling the flow of a fluid, a fluid conduit, a valve in said conduit, fluid chambers on each side of said valve, each having a deformable wall associated with said valve, two of said chambers communicating with the fluid conduit, and another of said chambers with a source of temperature responsive liquid and means associated with one of said deformable walls of said chambers for regulating the operation of said valve.

15. In an apparatus for controlling the flow of a fluid, a fluid conduit, a valve in said conduit, fluid chambers on each side of said valve, each having a deformable wall associated with said valve, two of said chambers communicating with the fluid conduit, and another of said chambers with a source of temperature responsive liquid and resilient means associated with one of said deformable walls of said chambers for regulating the operation of said valve.

PIERRE MAURICE JAUVERT.